O. A. WOOD.
DEMOUNTABLE RIM TOOL.
APPLICATION FILED APR. 21, 1916.
1,192,147.
Patented July 25, 1916.
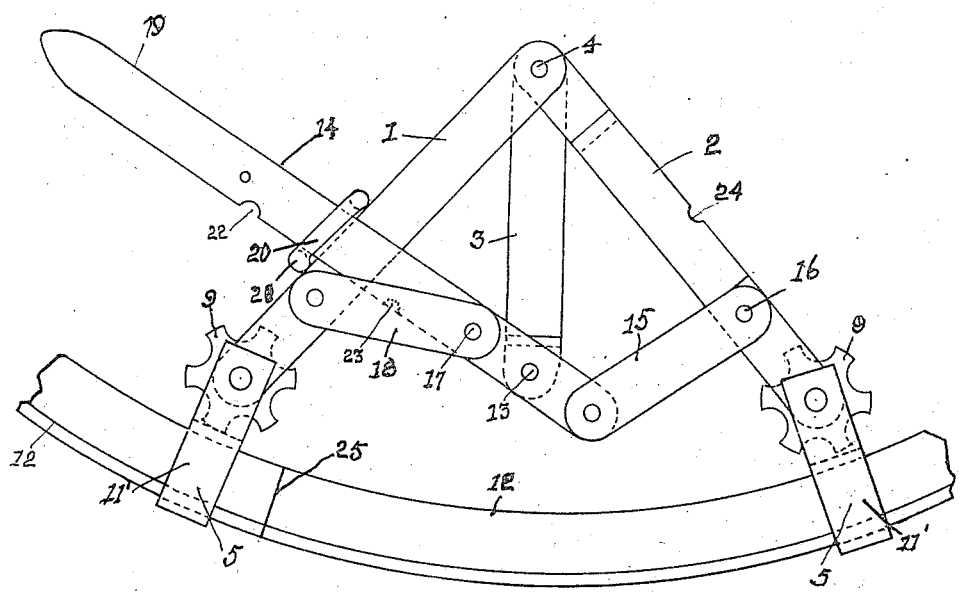
Fig. 1.
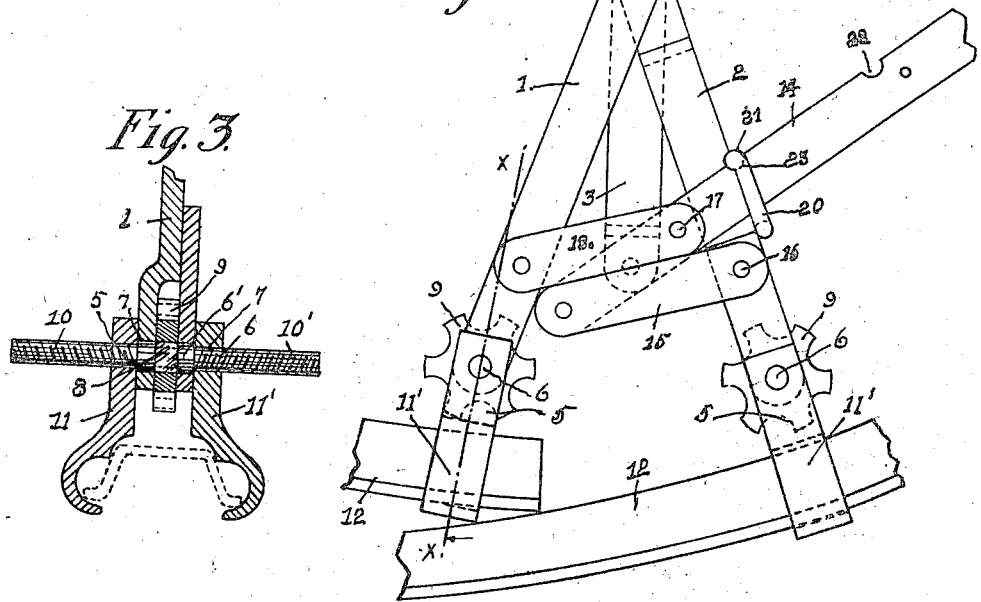
Fig. 2.
Fig. 3.
Inventor
Orson A. Wood
by Rob't B. Wilson
attorney

UNITED STATES PATENT OFFICE.

ORSON A. WOOD, OF BLISSFIELD, MICHIGAN.

DEMOUNTABLE-RIM TOOL.

1,192,147.   Specification of Letters Patent.   Patented July 25, 1916.

Application filed April 21, 1916.   Serial No. 92,576.

*To all whom it may concern:*

Be it known that I, ORSON A. WOOD, a citizen of the United States, residing at Blissfield, in the county of Lenawee and State of Michigan, have invented new and useful Improvements in Demountable-Rim Tools, of which the following is a specification.

My invention relates to a demountable rim tool and has for its object to provide a tool of the kind that is adapted to be readily applied to the demountable rim of an automobile wheel when the rim is demounted, and to readily detach and attach the rim from and to a pneumatic tire.

I accomplish these objects by the construction and combination of parts, as hereinafter described and illustrated in the drawings, in which—

Figure 1 is a side elevation of a tool constructed in accordance with my invention, attached to a demountable rim of the kind in general use on automobile wheels, in position for effecting the detachment of the rim from the tire (not shown). Fig. 2 is a similar view of the same showing the parts in position after the operation of the tool effecting the detachment of the rim from the tire has been performed. Fig. 3 is a broken away sectional view on line *x*—*x* of Fig. 2.

In the drawings 1 and 2 designate a pair of compass arms that are jointly pivoted at their upper end portions to the upper end portion of a fulcrum bar 3 by a pivot 4. At their lower end portions the arms 1 and 2 are bifurcated, as shown in Fig. 3, and each are provided with a rim clamp 5, each clamp comprising a screw 6, having a central bearing portion 6' rotatably mounted in alined bearings 7 in the bifurcations of the arms. The central bearing portions of the screws 6 each have a central squared portion 8 upon which is fixedly mounted a capstan 9 between the bifurcations of the arms, and opposite extensions 10 and 10', the extensions 10 being provided with a right thread and the extensions 10' being left threaded.

On the threaded extensions 10 and 10' are mounted the complementary clamping jaws 11 and 11', having orifices in their top end portions respectively threaded complementary to the threaded extensions 10 and 10' of the screws 6, whereby when the screws are turned in one direction the jaws are run inward on the screws into engagement with a rim 12, and when turned in the opposite direction the jaws are run outward thereon to release the rim and detach the jaws therefrom.

To the lower end portion of the fulcrum bar 3 is pivoted by a pin 13 near its lower end, a lever 14 which is pivotally connected at its lower end to one end of a link bar 15, the opposite end portion of which is pivoted by the pin 16 to the arm 2 a short distance above its clamp 5. The lever 14 also has pivoted thereto by the pin 17 at an equal distance above the pin 13 as the pin 16 is below it, one end of a link bar 18 the opposite end of which is pivoted to the arm 1 a short distance above the clamp 5 of that arm. The upper end portion of the lever 14 is formed as a handle 19 and on the lever is mounted a link latch 20 having a rounded latch portion 21 at one end, which is adapted to engage with either of the notches 22 or 23, which are on the underside of the lever when in the position shown in Fig. 1, and on the upper side when the lever is thrown into the position shown in Fig. 2. The arm 2 is also provided on its upper side with a notch 24, which is adapted to be engaged by the latch portion 21 when the lever 14 is in the position shown in Fig. 2. Thus constructed, when the clamp 5 of the arm 1 is clamped to the rim 12 near its joint 25 and the clamp 5 of the arm 2 is clamped to the rim on the opposite side of the joint 25 at a suitable distance therefrom, as shown in Fig. 1, by moving the lever from its position, as shown in Fig. 1, to its position as shown in Fig. 2, the arm 1 is lifted upward and forward toward the arm 2 by the links 15 and 18 whereby the end portion of the rim to which the arm 1 is attached is carried upward and forward over the opposite end portion of the rim, as shown in Fig. 2, thereby reducing the diameter of the rim sufficient to allow the ready detachment of the tire therefrom. In moving the lever 14 the latch 20 rides upward along the arm 1 over the top ends of the arms 1 and 2, and down the upper edge of the arm 2 to the notch 24, into which it drops as the lever reaches the position shown in Fig. 2, where it locks the lever and holds the rim against springing back into its normal position.

When the tire is repaired or a new one is substituted therefor, by releasing the latch from the notch 24 and throwing the lever back to its normal position, the repaired or substituted tire is quickly mounted and secured on the rim, and the latter is ready to be re-mounted on the wheel.

The clamp jaws 11 and 11' are of such form on their clamping faces that they will firmly engage the marginal portions of the different forms of rims commonly used, whereby it is unnecessary to provide the tool with a different pair of jaws for each special form of demountable rim.

By the construction and combination of parts, as shown, described and claimed, I have provided a convenient and effective tool for detaching a rim from a tire and for re-attaching it thereto, and one that provides great advantage of leverage for springing the rim out of and back into its normal circular form.

What I claim to be new is—

1. In a tool of the kind and for the purpose described, a fulcrum bar, a pair of compass arms pivoted at their upper end to the upper end of the fulcrum bar, said arms having their lower ends bifurcated and each provided with a clamping screw having opposite projecting right and left threaded end portions, a pair of jaws mounted respectively on the threaded end portions of each screw and adapted to be run toward each other when the screw is turned in one direction and away from each other when the screw is turned in the opposite direction, a lever pivoted to the lower end portion of the fulcrum bar to form a short arm extending below the pivot and a long arm above the pivot, a link bar connecting the free end portion of the short arm of the lever with one of the compass arms near above its bifurcations, a companion link bar connecting the long arm of the lever above the pivot with the other compass arm near above its bifurcations, and means to lock the lever to the second compass arm in different positions of the lever; said lever and its link bars being adapted, when the long arm of the lever is moved transverse the first compass arm to increase the angle of the compass arms, and when transverse the second compass arm to diminish said angle.

2. In a tool of the kind and for the purpose described, a fulcrum bar, a pair of compass arms pivoted at their upper end to the upper end of the fulcrum bar, said arms having their lower ends bifurcated, a clamping screw journaled centrally and transversely in the bifurcations of each compass arm, and having opposite projecting right and left threaded end portions, a pair of jaws mounted respectively on the threaded end portions of each screw and adapted to be run toward each other when the screw is turned in one direction and away from each other when the screw is turned in the opposite direction, means fixedly mounted on each screw between the bifurcations of the compass arms to rotate the screws, a lever pivoted to the lower end portion of the fulcrum bar to form a short arm extending below the pivot, and a long arm above the pivot, a link bar connecting the free end portion of the short arm of the lever with one of the compass arms near above its bifurcations, a companion link bar connecting the long arm of the lever above the pivot with the other compass arm near above its bifurcations, and means to lock the lever to the second compass arm in different positions of the lever; said lever and its link bars being adapted, when the long arm of the lever is moved transverse the first compass arm to increase the angle of the compass arms, and when transverse the second compass arm to diminish said angle.

In testimony whereof I have hereunto set my hand at Toledo, Ohio, this 4th day of April, 1916, in the presence of two subscribing witnesses.

ORSON A. WOOD.

In presence of:
R. B. SONCRANT,
G. WM. BAUMGARTNER.